(12) United States Patent
Chen

(10) Patent No.: US 6,462,525 B1
(45) Date of Patent: *Oct. 8, 2002

(54) POLYPHASE PWM CONVERTER WITH HIGH EFFICIENCY AT LIGHT LOADS

(75) Inventor: Wei Chen, Campbell, CA (US)

(73) Assignee: Linear Technology Corp., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/995,701

(22) Filed: Nov. 29, 2001

Related U.S. Application Data

(63) Continuation of application No. 09/503,549, filed on Feb. 14, 2000.

(51) Int. Cl.[7] ............................................. G05F 1/40
(52) U.S. Cl. ................................... 323/285; 323/282
(58) Field of Search ............................ 323/285, 284, 323/283, 280, 281, 282

(56) References Cited

U.S. PATENT DOCUMENTS

| | | | |
|---|---|---|---|
| 4,270,165 A | 5/1981 | Carpenter et al. ............ 363/65 |
| 4,366,389 A | * 12/1982 | Hussey ......................... 307/66 |
| 5,386,147 A | 1/1995 | Bonneau et al. .............. 307/64 |
| 6,055,167 A | 4/2000 | Shamkovich et al. ......... 363/52 |
| 6,137,274 A | * 10/2000 | Rajagopalan ............... 323/272 |
| 6,281,666 B1 | 8/2001 | Tressler et al. ............. 323/272 |

* cited by examiner

*Primary Examiner*—Rajnikant B. Patel
(74) *Attorney, Agent, or Firm*—Fish & Neave; Joel Weiss; Jeffrey C. Aldridge

(57) ABSTRACT

A multi-phase multi-channel voltage regulator having high efficiency at light loads is provided. The regulator increases efficiency at light loads by shutting down a select channel of the regulator. In addition, the regulator may place remaining channels in Burst Mode.

12 Claims, 7 Drawing Sheets

POLYPHASE PWM CONVERTER WITH HIGH EFFICIENCY AT LIGHT LOADS

CROSS-REFERENCE TO RELATED APPLICATION

This is a continuation of application Ser. No. 09/503,549, filed Feb. 14, 2000. This prior application is hereby incorporated by reference herein in its entirety.

BACKGROUND OF THE INVENTION

This invention relates to apparatus and techniques for regulating voltages. More specifically, this invention relates to apparatus and techniques using multi-channel, multi-phase regulators—i.e., regulators that use multiple small regulators with interleaved phases, wherein each small regulator represents a channel, to produce a single regulated output.

The evolution of logic and computing devices has resulted in a need for smaller loadpoint power regulators to supply lower voltages and higher currents. High efficiency at full load is essential for alleviating the thermal stress that results from increased heat generated by higher current in a smaller space. PWM switched mode power conversion techniques and low ON-resistance MOSFETs are usually adopted for these types of high current applications in order to minimize the conduction loss at full load conditions. However, low ON-resistance MOSFETs tend to have large parasitic capacitance and gate charge, which may cause high switching losses and gate-drive losses at high switching frequencies.

Because high switching frequencies introduce significant switching related power loss in semiconductors and core loss in magnetic components, it follows that decreasing the effective switching frequency at light loads reduces the switching related loss and increases the efficiency. Although the conduction loss drops significantly at light loads because it is proportional to the square of the—current, an unnecessarily large number of MOSFETs are still switched, resulting in excessive switching loss and gate driving loss.

In fact, under light load conditions, switching-related power losses dominate. The efficiency at light loads suffers greatly. This conflicts with the widely adopted Energy Star requirement, which demands that efficiency at light loads be maximized when the system is in stand-by mode.

This problem can be at least partially alleviated by employing the multi-phase or PolyPhase™ PWM technique. This technique is more fully described in co-pending, commonly assigned U.S. patent application Ser. No. 09/114,384, filed Jul. 13, 1998, which is incorporated by reference herein in its entirety. Instead of using a single bulky power regulator, which relies on increasing the frequency to reduce the size of power supply, the PolyPhase technique parallels several small regulators and interleaves the phases of their clock signals. Utilizing small regulators reduces the size of the capacitors and inductors required by the circuit. This is made possible, at least in part, by input and output ripple current cancellation between the multiple regulators which occurs when the phases are properly interleaved. Because the switching frequency for each individual regulator remains relatively low, the switching losses associated with the individual power MOSFETs are smaller. This helps maintain a relatively high efficiency at light load.

It would be desirable to further increase the light load efficiency in a multi-channel multi-phase regulator.

SUMMARY OF THE INVENTION

It is an object of the invention to further increase the light load efficiency in a multi-channel multi-phase regulator.

A multi-channel multi-phase voltage regulator that has an output is provided. The regulator includes at least one detection circuit that compares the output to a threshold value and shuts down at least one channel of the multi-channel multi-phase regulator when the detection circuit determines that, based on the comparison, the output is in a light load condition.

In an alternative embodiment of the invention, the detection circuit may also place remaining channels that were not shut down in stand-by mode when the output is determined to be in a light load condition.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout.

DETAILED DESCRIPTION OF THE INVENTION

The PolyPhase technique, as described in co-pending commonly assigned U.S. patent application Ser. No. 09/114, 384, is an attractive power solution for high current applications because it achieves a small size without increasing the switching frequency. Because of the small size, the resulting switching related loss at light loads is much smaller. Thus, the light load efficiency is substantially higher than the conventional single phase bulky power supply.

The present invention further improves the light load efficiencies of a PolyPhase regulator by turning off some of the paralleled regulators (or, alternatively, channels) in a PolyPhase regulator during light load conditions. The loss reductions can be realized in three ways. First, because a smaller number of power semiconductors are switched, the gate driving loss, turn-ON and turn-OFF losses, and the diode reverse recovery loss are decreased. Second, the overall magnetic core loss is reduced because fewer magnetic components are involved in switching. Third, fewer ICs are in operation and the quiescent current at light load is minimized. Thus, the light load efficiency is boosted.

In a PolyPhase regulator according to the invention, the number of paralleled channels in operation may be approximately proportional to the amount of load current. The load conditions are therefore monitored for proper operation. For example, in a regulator with three channels, when the load current decreases from full load to a first threshold, the first channel is turned off. As the load current drops further to the next threshold, the second channel is turned off. Thus, only one channel preferably operates at minimum load. Conversely, if the load current increases from light load, additional channels preferably join the operation when the load current rises to the threshold that corresponds to each channel.

The phase configuration of the channels may preferably be rearranged to minimize the input and output ripple currents whenever the number of the paralleled channels changes. (The term "input ripple current" as used herein refers to the pattern of change in the input current to the channels which results from the switching of the duty cycles of the channels. The term "output ripple current" as used herein refers to the pattern of change in the sum of the output currents of all the channels. For example, if one channel in a four-channel, four-phase regulator turns off, the phase number should preferably change to three-phase, though other phase numbers are possible.

Figure 1:
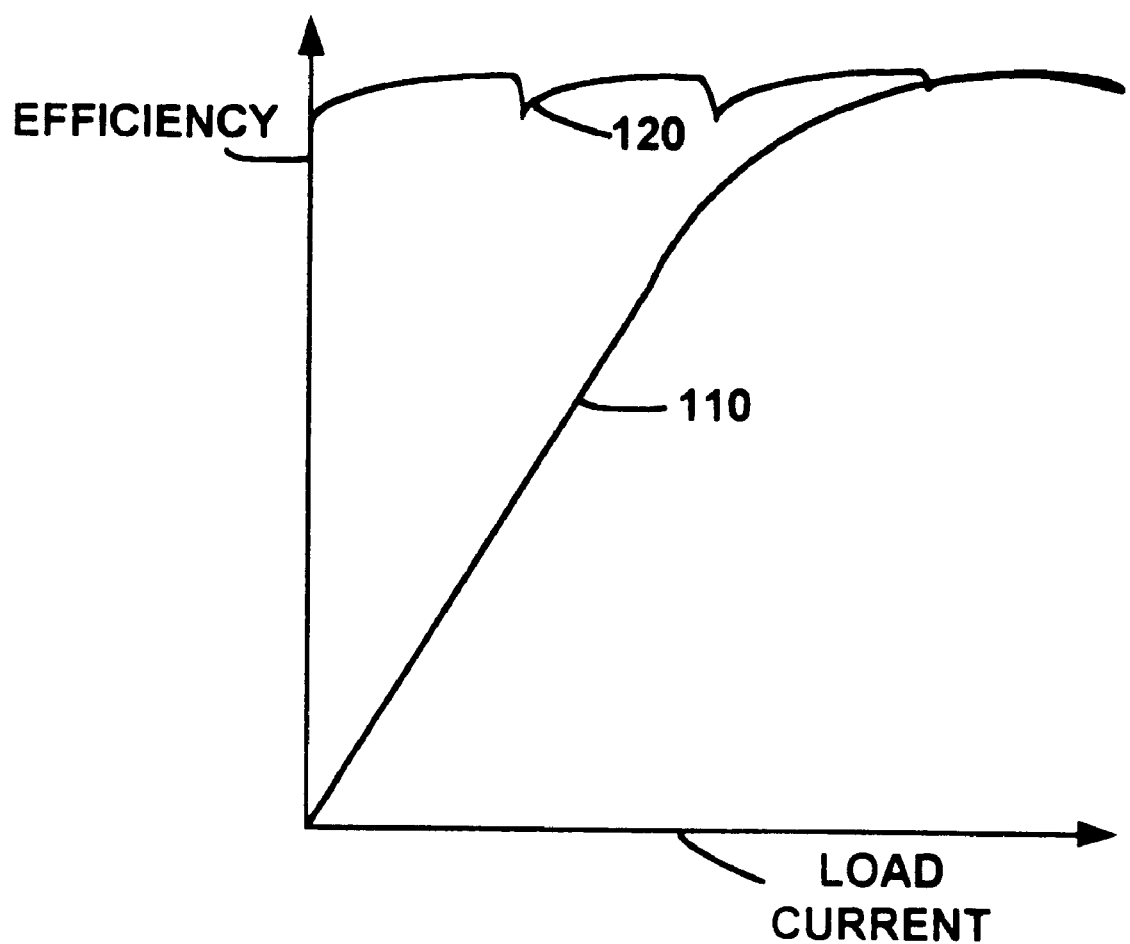
FIG. 1 is a diagram of the efficiency of a PolyPhase regulator according to the invention.

As shown in FIG. 1, the typical efficiency of a conventional high current power supply, shown by line 110, drops very quickly when the load current decreases. In contrast, the efficiency of the technique according to the invention maintains high efficiency, as shown by line 120, across the entire range of load currents. This higher efficiency results because the conduction loss, the switching loss and the magnetic core loss decrease with the decrease in load current. Moreover, the smaller the difference between two neighboring load thresholds, the more constant the efficiency as the load changes.

The load current can be detected by measuring the current directly via sense resistors in the load current path, or by measuring the parasitic resistances of the power components (MOSFETs, inductors, etc.) or in any other suitable fashion. In a current mode controller, the load current level can also be determined from an error amplifier output in the feedback loop. This feedback loop may be a voltage feedback loop.

As described above, the shutdown of the paralleled channels in a PolyPhase regulator preferably decreases the number of phases of the regulator. The lower phase number, however, may decrease the effectiveness of ripple current cancellation. To offset this reduction in effectiveness of ripple current cancellation, and, thereby, to maintain low output ripple voltage at light loads, the nonlinear inductance characteristics of high frequency power inductors may be utilized in the power loop of the regulator.

Figure 2:
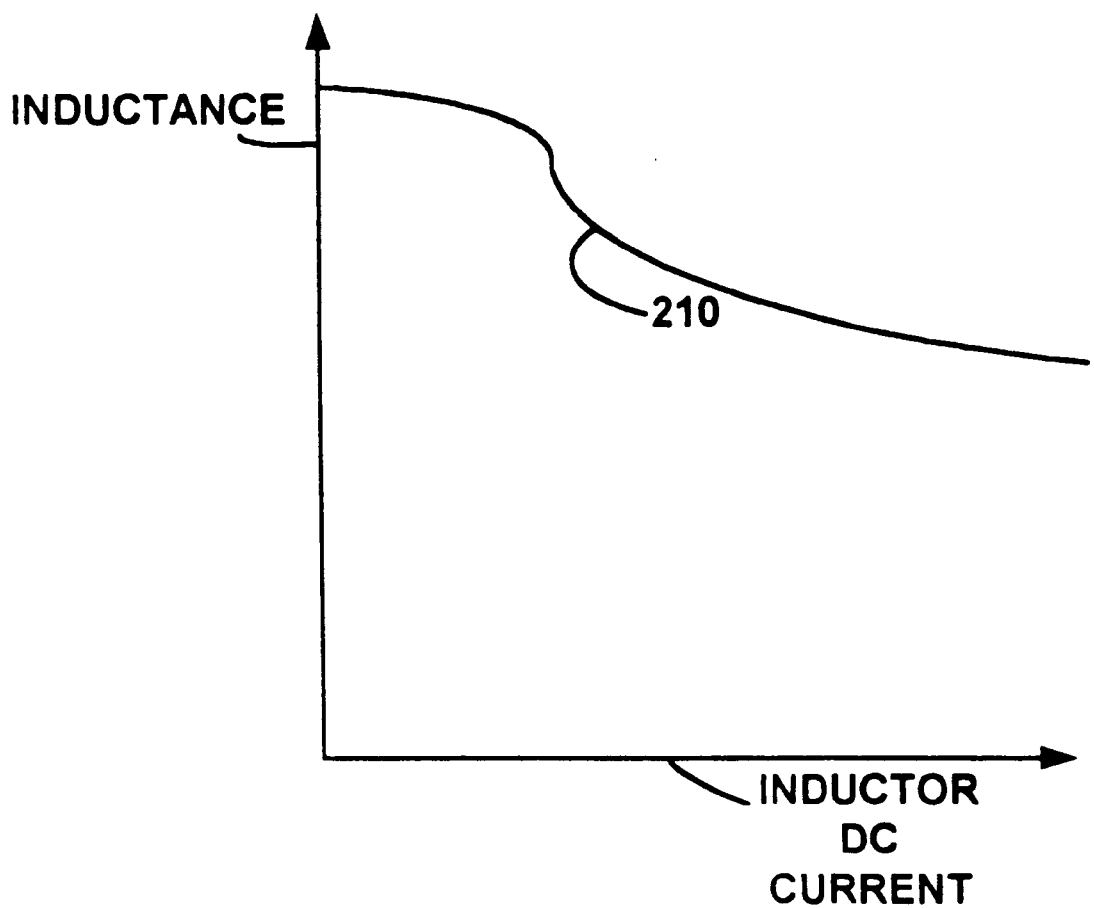
FIG. 2 is a diagram of the inductance of a non-linear inductor.

FIG. 2 shows the inductance characteristics of an exemplary high frequency power inductor. As shown in FIG. 2, the inductance of such devices typically increases as the inductor dc current decreases. The output ripple is much lower at light loads if such inductors are used. This makes it possible to change the number of phases in a PolyPhase regulator at light load without increasing the output ripple voltage.

To further minimize the power loss at no load or extremely light load, it may be preferable to operate the remaining one channel (or multiple remaining channels) in the Burst Mode (or stand-by mode). In Burst Mode, a control circuit may preferably turn OFF the remaining channel and stop it from switching at all when the output voltage exceeds a pre-determined upper limit and turn ON the remaining channel when the output voltage drops to a pre-determined lower limit.

The following values are exemplary values of a regulator circuit built according to the invention. These values are used in connection with the remaining FIGURES to particularly point out and describes the invention, but are in now way to be construed as limiting the invention to these particularly values. The exemplary values of such a regulator are:

| Input: | 12V DC (±10%) |
| Output: | 1.5V DC/40$A_{max}$ (A = amperes) |

Efficiency: Greater than about 80% when the load current is between 2 A and 40 A.

Switching frequency: 120 KHz (of each individual channel)

Figure 3:
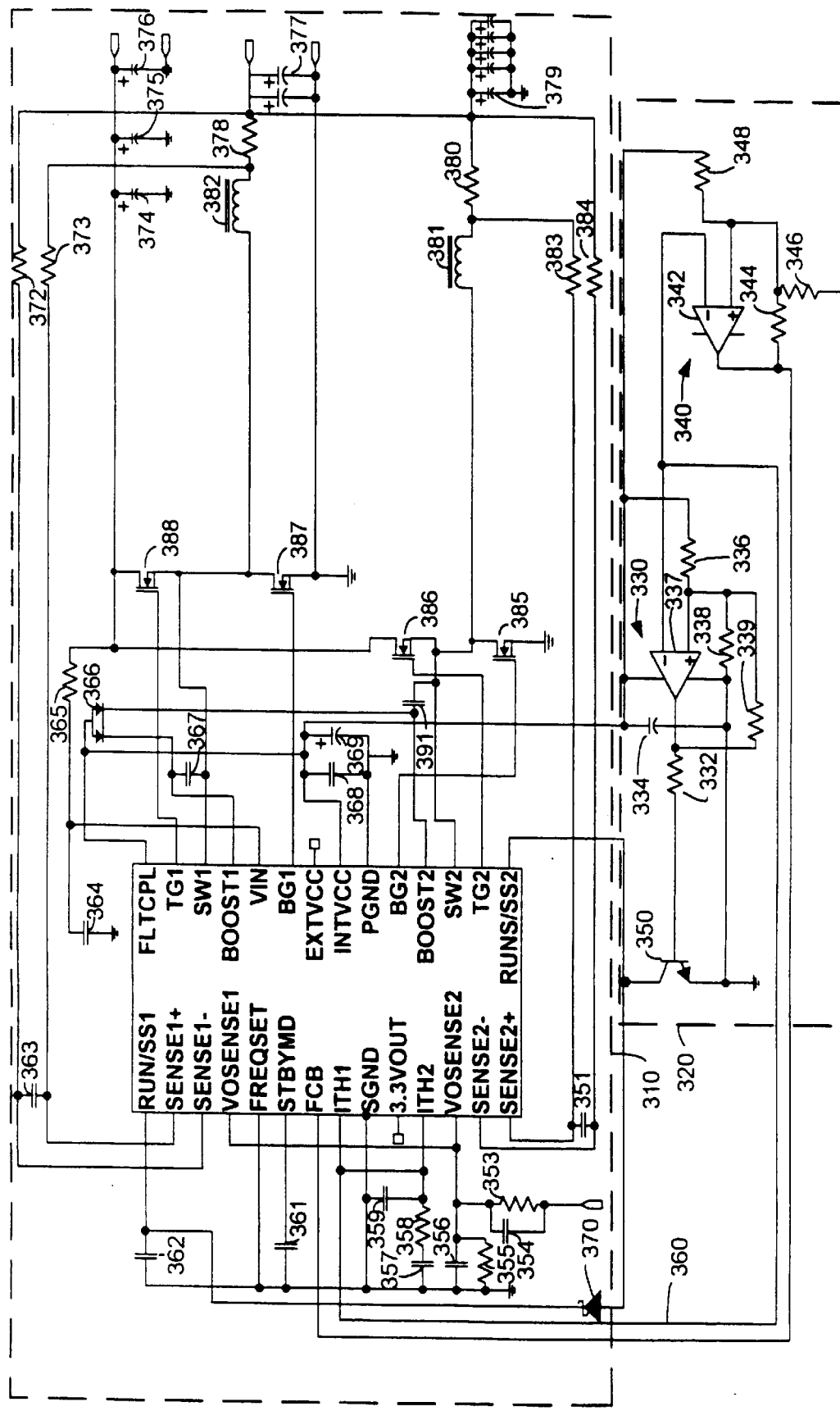
FIG. 3 is a circuit diagram of a PolyPhase regulator according to the invention.

FIG. 3 shows a detailed schematic diagram of a PolyPhase regulator according to the invention. A two-channel, two-phase current mode regulator, the LTC1628 produced by Linear Technology Corp. of Milpitas, Calif., is used to illustrate the invention. Box 310 includes the LTC1628 chip, and various operational circuitry which may be used to operate the chip.

The following is a short description of the operation of the LTC1628. However, the LTC1628 data sheet, available at http:www.linear-tech.com and hereby incorporated by reference in its entirety, describes the operation of the LTC1628 in detail.

The FLTCPL (the Fault Coupling Threshold) and the circuitry attached thereto is for determining if fault/normal conditions on one controller will act on the other controller.

The TG1 and TG2 are high current gate drives for top N-Channel MOSFETs. The MOSFET gates attached to these pins are driven by outputs from these pins.

The SW1 and SW2 are switch node connections to inductors.

The BOOST1 and BOOST2 are bootstrapped supplies to the top side floating drivers. Capacitors may be connected between the boost and switch pins and Schottky diodes may be tied between the boost and INTVcc pins.

The Vin is the main supply pin. A bypass capacitor may preferably be tied between this pin and the signal ground pin.

EXTVcc is an external power input to an internal switch connected to the INTVcc.

INTVcc is the output of an internal 5 V linear low dropout regulator and the EXTVcc switch. The driver and control circuits are powered from this voltage source. This pin may preferably be decoupled to power ground with a minimum of 4.7 $\mu$F tantalum or other low ESR capacitor.

PGND is the driver power ground. It may be connected to the sources of bottom N-channel MOSFETs and the anodes of the Schottky rectifiers.

RUN/SS1 and RUN/SS2 are a combination of soft-start, run control inputs and short-circuit detection timers. Forcing either of these pins back below 1.0V shuts down the circuitry required for that particular controller. Latch-OFF overcurrent protection is also invoked via this pin.

SENSE1+ and SENSE2+ are the positive inputs to the differential current comparators on the LTC1628.

SENSE1− and SENSE2− are the negative inputs to the differential current comparators on the LTC1628.

VOSENSE1 and VOSENSE2 receive the remotely-sensed feedback voltage for each controller from an external resistive divider across the output.

FREQSET is the frequency control input to an internal oscillator.

STBYMD determines which circuitry remains active when the controllers are shut down and/or provides a common control point to shut down both controllers.

FCB is the forced continuous control loop—i.e., stand-by mode or Burst Mode. This preferably acts on the first controller and is normally used to regulate a secondary winding. Pulling this pin below 0.8V forces continuous synchronous operation for the first and optionally the second controller.

ITH1 and ITH2 are the error amplifier output and switching regulator compensation point, respectively. Each associated channels' current comparator trip point increases with this control voltage.

SGND is the small signal ground common to both controllers.

3.3VOUT is the output of a linear regulator capable of supplying 10 mA DC with peak currents as high as 50 mA.

FIG. 3 shows a schematic diagram of an exemplary circuit according to the invention. The circuit is divided into two dashed-line boxes. Box 310 includes the LTC1628 and its associated circuitry. Box 320 includes the additional circuitry according to the invention. The following table shows exemplary values of the elements in FIG. 3.

| Element Number | Exemplary Value (or Part Number) |
|---|---|
| 332 | 100K (K = 1,000 ohms) |
| 334 | .1 µF (µF = 10$^{-6}$ farads) |
| 336 | 56.2K |
| 337 | LT1017 (produced by assignee Linear Technology Corp. of Milpitas, California |
| 338 | 11K |
| 339 | 121K |
| 342 | LT1017 |
| 344 | 200K |
| 346 | 2.74K |
| 348 | 20K |
| 350 | 2N2222 |
| 351 | 1000 pF (pF = 10$^{-12}$ farads) |
| 353 | 30.1K |
| 354 | 470 pF |
| 355 | 34K |
| 356 | 100 pF |
| 357 | 4.7 nF (nF = 10$^{-9}$ farads) |
| 358 | 10K |
| 359 | 100 pF |
| 361 | .01 µF |
| 362 | .1 µF |
| 363 | 1000 pF |
| 364 | .1 µF |
| 365 | 10 ohms |
| 366 | BAT54A |
| 367 | .47 µF |
| 368 | 1 µF |
| 369 | 10 µF/6.3 V |
| 370 | 1N4148 |
| 372 | 12 ohms |
| 373 | 12 ohms |
| 374 | 150 µF |
| 375 | 150 µF |
| 376 | 150 µF |
| 377 | Each capacitor is 470 µF/6.3 V |
| 378 | 0.002 ohms |
| 379 | Each capacitor is 470 µF/6.3 V |
| 380 | 0.002 ohms |
| 381 | 1.0 µH Sumida CEPH149-1ROMO |
| 382 | 1.0 µH Sumida CEPH149-1ROMO |
| 383 | 12 ohms |
| 384 | 12 ohms |
| 385 | four Si4420 |
| 386 | four Si4420 |
| 387 | four Si4420 |
| 388 | four Si4420 |
| 391 | .47 µF |

Box 320 includes circuitry which, according to the invention, may preferably be used to selectively shut down individual regulators within the LTC1628, as will be explained.

Box 320 includes comparators 330 and 340 (the comparators can be replaced by any suitable signal-level detection circuitry), resistors 332, 336, 338, 339, 344, 346, 348 and capacitor 334.

Comparators 330 and 340 compare a substantially constant voltage at their non-inverting terminals to the voltage taken from the ITH1 pin (This voltage is preferably proportional to the load current.) The constant voltage at the non-inverting terminal is preferably derived from a reasonably accurate voltage reference.

The circuit shown in FIG. 3 using the exemplary values specified above operates as follows. When the load current is greater than 7 A, the output of comparator 330, taken from resistor 332, and the output of comparator 340, taken from the output of op-amp 342, are low. When each of the outputs of comparators 330 and 340 are low, two synchronous buck regulators, which form channels 1 and 2 within the LTC1628, supply current to the load. These regulators are preferably interleaved 180° out of phase with one another.

When the load current decreases below 7 A, the output of comparator 330 becomes high. The high output of comparator 330 turns ON transistor 350, which, in turn, shuts OFF channel 2 by forcing the RUN/SS2 pin down preferably below 1.0V. (Diode 370 preferably prevents the RUN/SS1 pin from being pulled below 1.0V, while allowing the output of comparator 330 to raise the RUN/SS1 pin when the load current increases quickly. Allowing the RUN/SS1 pin to rise prevents an undesirable soft-start during operation when there are sharp increases in the operational load current.) This increases the efficiency of the PolyPhase regulator by about 3% at load currents below 7 A.

When the load current decreases to 2A, the output of comparator 340 becomes high, forcing FCB pin to a particular value, preferably above 0.8 volts, and, thereby, enables Burst Mode operation of the remaining channel 1 (in an alternative embodiment, Burst Mode can be enabled for both channel 1 and channel 2 simultaneously, if so desired). As discussed above, in Burst Mode, channel 1 may be shut OFF when the output voltage exceeds a pre-determined upper limit and turned ON when the output voltage drops to a pre-determined lower limit.

Figure 4:
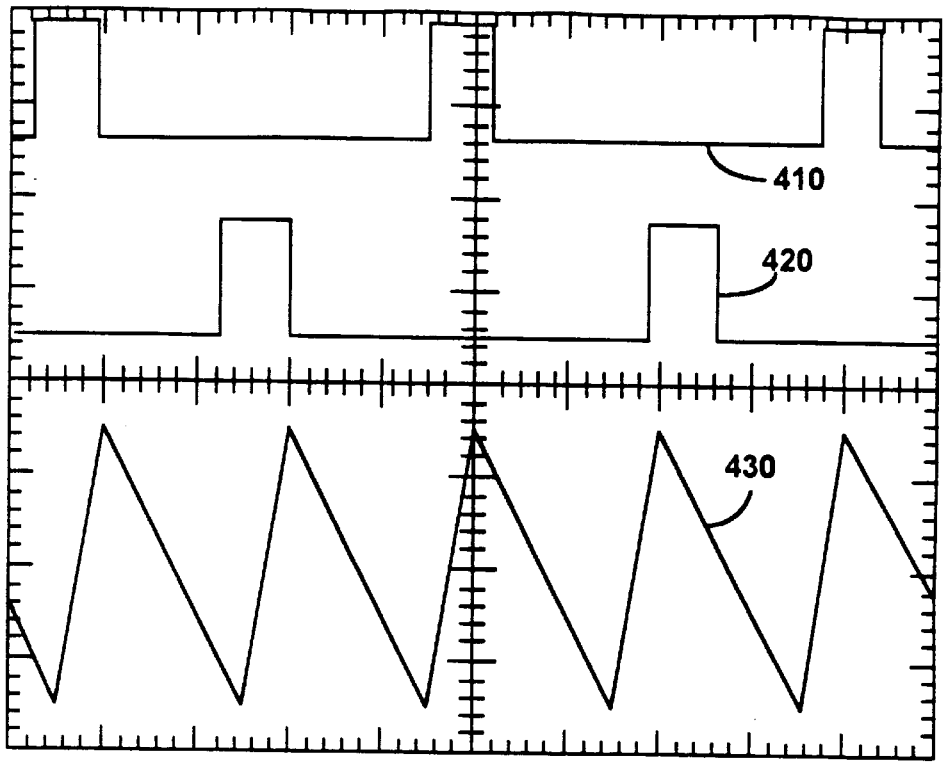
FIG. 4 is a diagram of the output ripple voltage of a circuit according to the invention at a first load current.
Figure 5:
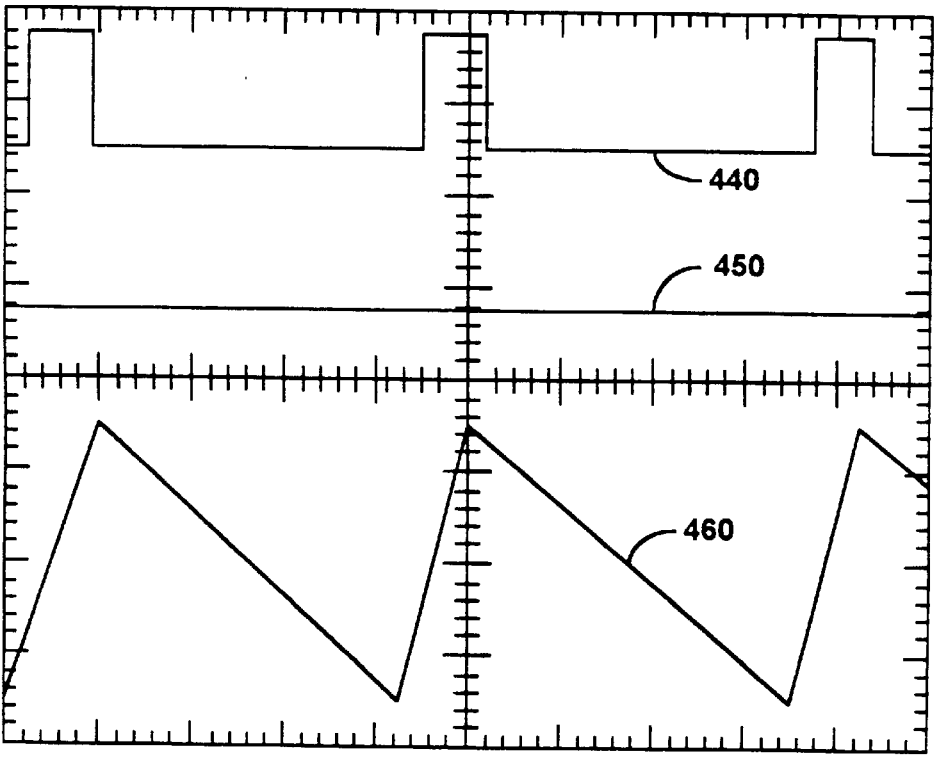
FIG. 5 is a diagram of the output ripple voltage of a circuit according to the invention at a second load current.

FIGS. 4 and 5 use the following values to illustrate operation of the invention: the top traces 410, 440 in each FIGURE represent the switch node voltage on channel 1 (10V/division), the middle traces 420, 450 represent the switch node voltage on channel 2 (10V/division) and the bottom traces 430, 460 represent the output ripple voltage (10 mV/division). FIG. 4 shows the waveforms for a 40 A output and FIG. 5 shows the waveforms for a 4 A output.

As shown in FIG. 4, the output ripple voltage 430 at 40 A output is about 30 mVpp(peak-to-peak) and the ripple frequency is 240 KHz, twice the switching frequency of the exemplary values described above. The increased ripple frequency over the exemplary frequency mentioned above results from the increased switching activity caused by the multiple regulators.

FIG. 5 shows the output ripple voltage at 4 A output. Trace 450 indicates that at 4 A output, channel 2 has been shut OFF. It can be seen from trace 460 that the reduction in the phase number does not increase the maximum output ripple voltage although the ripple frequency is halved. This is because of the nonlinear inductance of the particular inductors used in the regulator shown in FIG. 3 (One example of such an inductor is the Panasonic ETQPAFlR3E).

Figure 6:
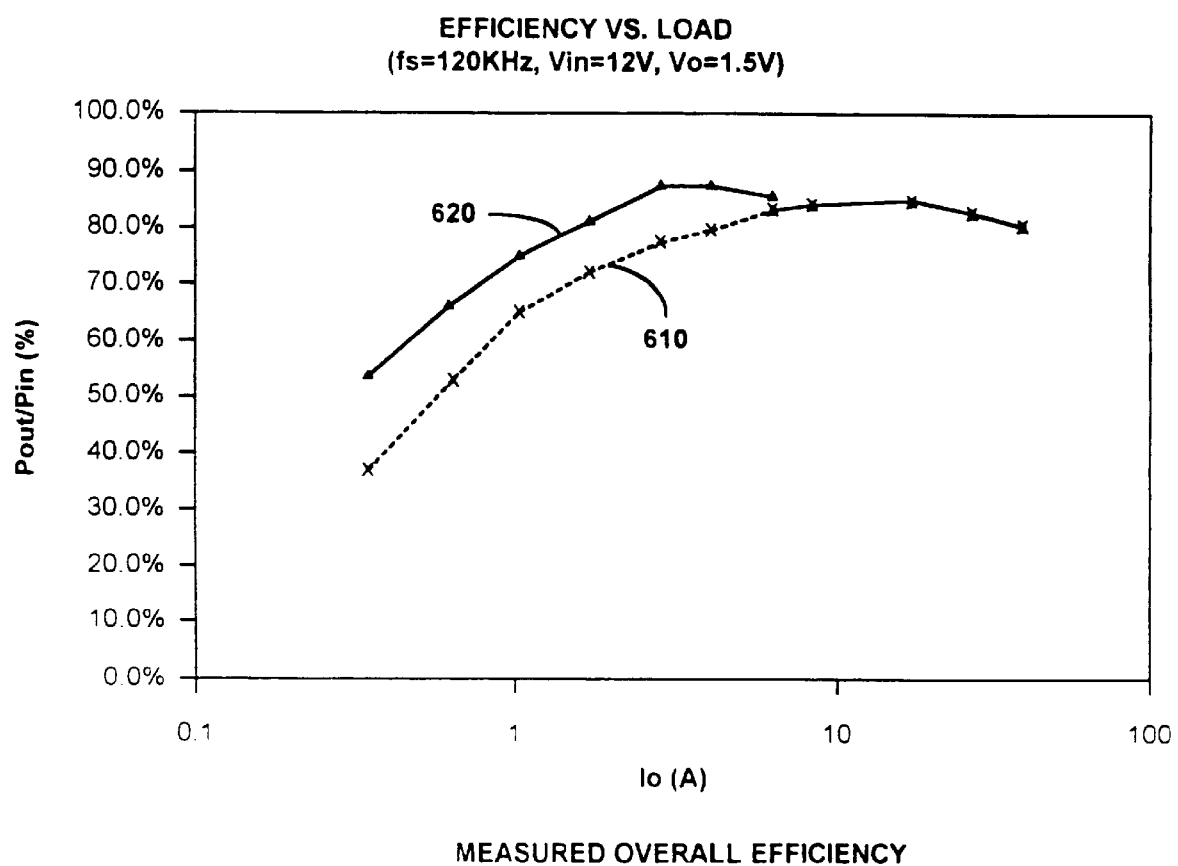
FIG. 6 is a diagram of the actual efficiency of a PolyPhase converter according to the invention.

FIG. 6 compares the measured efficiency—i.e., the Pout/Pin over a full range of output currents —of a PolyPhase regulator as described in application Ser. No. 09/114,384, as shown by curve 610, and the efficiency for a PolyPhase regulator according to the invention, as shown by curve 620. The load current is shown along the x-axis on a logarithmic scale. In this example, as noted above, the switching frequency for each individual channel is about 120 KHz, the Vin is about 12V and the Vo is about 1.5V. As evidenced by FIG. 6, the PolyPhase regulator according to the invention is shown to have a substantially higher efficiency at light loads.

Figure 7:
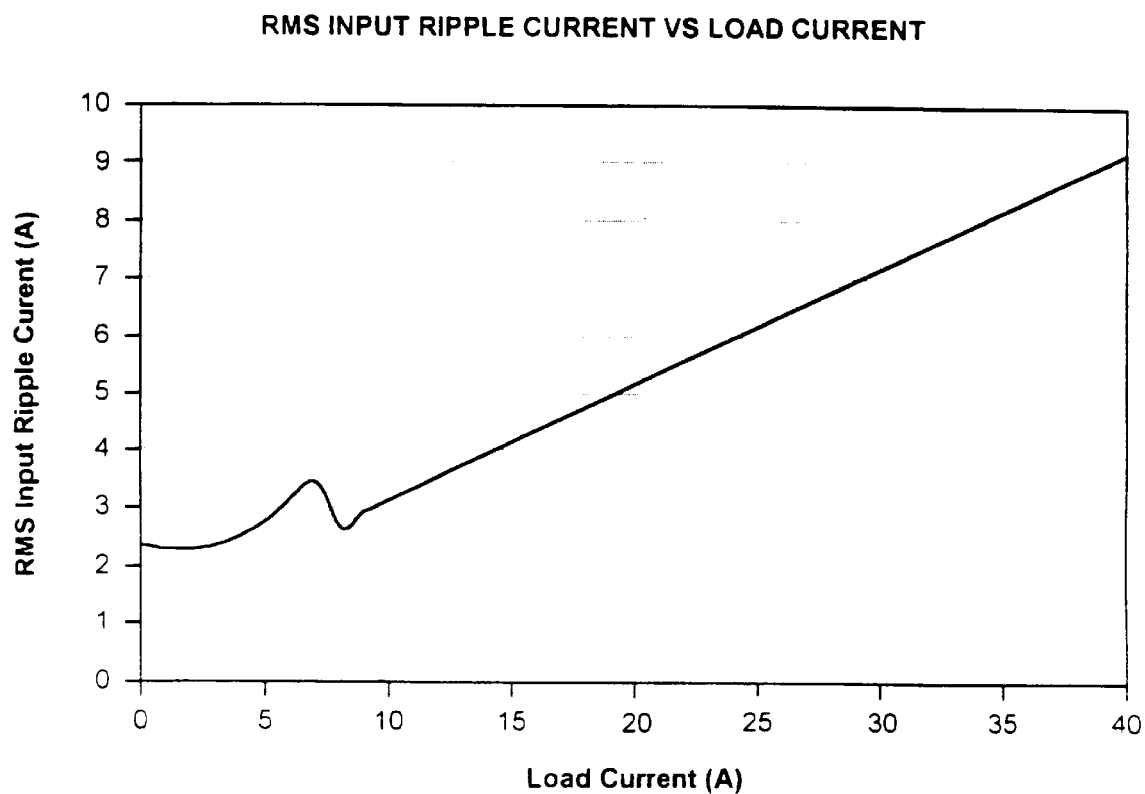
FIG. 7 is a diagram of the RMS Input Ripple Current of a PolyPhase converter according to the invention.

FIG. 7 plots the RMS(root-mean-square) input ripple current 710 for the example illustrated in the previous FIGURES. The maximum input ripple current usually determines the size and cost of the input capacitors and EMI (electromagnetic interference) filter required by the regulator.

In the PolyPhase converter in application No. 09/114,384, the maximum input ripple current is seen at the full load condition. The ripple current shown in FIG. 7 is about 9.3 $A_{RMS}$ at full load, 40 A. It decreases to 2.5 A $_{RMS}$ at about 8A output and increases to only 3.4$A_{RMS}$ when one channel is turned off. Thus, shutting OFF one of the paralleled regulators does not necessarily change the nature or location of the worst-case input ripple current because the maximum input ripple current is still seen at the full load condition.

Figure 8:
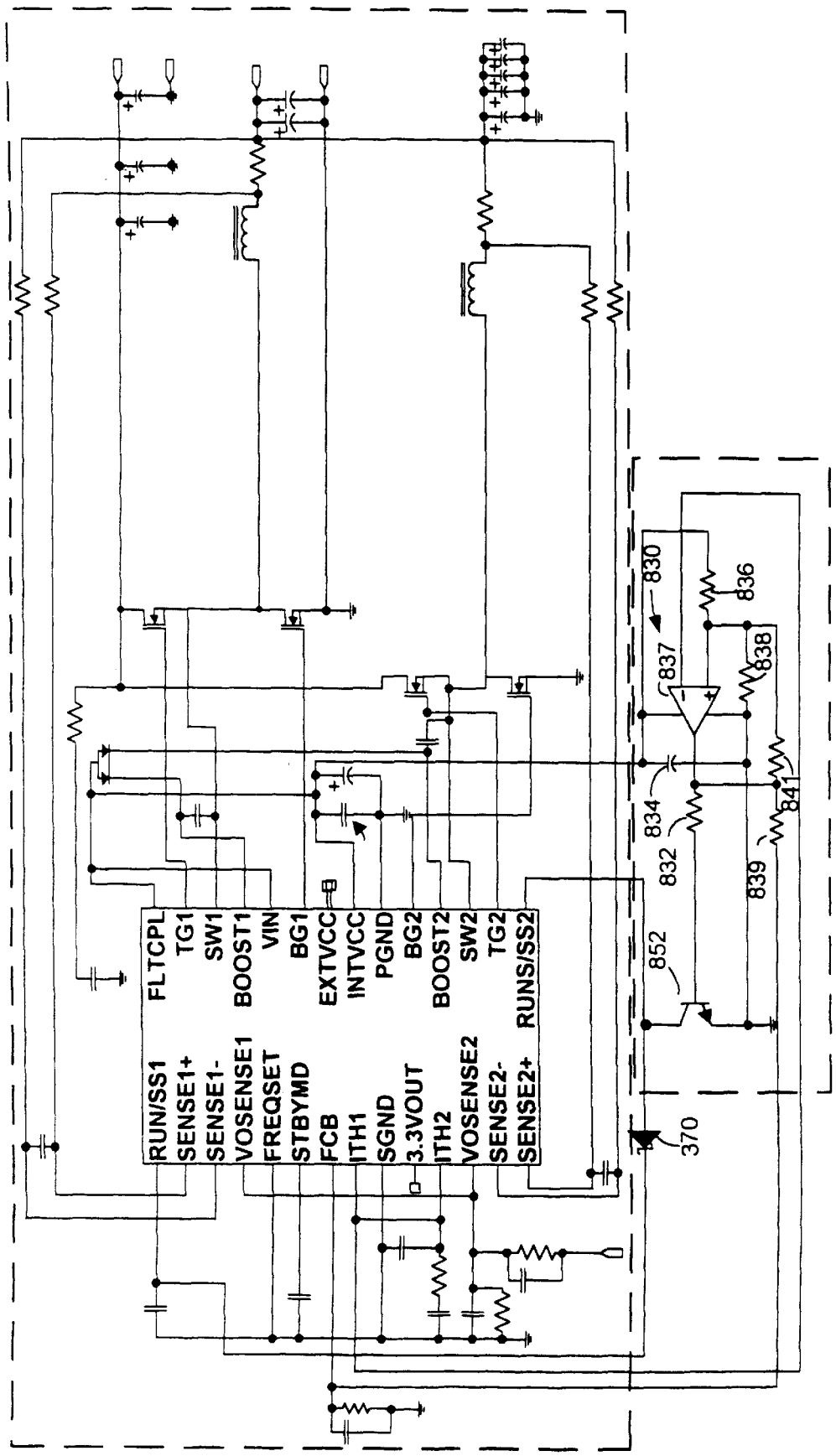
FIG. 8 is a circuit diagram of another embodiment of a PolyPhase converter according to the invention.

In another embodiment, FIG. 8 shows a schematic diagram of an alternative implementation of a PolyPhase regulator according to the invention. The regulator in FIG. 8 uses only one comparator 810 circuit. In the alternative embodiment shown in FIG. 8, one of the channels is shut OFF, and Burst Mode is enabled, at the same load current level. Therefore, only one comparator 810 is needed. (In contrast, the circuit shown in FIG. 3 shuts OFF one of the channels at a first load current level and enables Burst Mode operation at a different level. As a result, two comparators are needed for the circuit shown in FIG. 3.)

In the exemplary embodiment shown in FIG. 8, when the load current is lower than 7 A, comparator 810 shuts down channel 2 and, substantially simultaneously, enables Burst Mode operation in channel 1.

In conclusion, the invention increases efficiency at light loads for circuits implementing the PolyPhase technique. More specifically, the present invention shows that selectively shutting down one (or more) of the paralleled regulators at light loads and, under certain circumstances, enabling Burst Mode operation in the remaining channels, can significantly reduce the power dissipation and increase the efficiency of the PolyPhase regulator at light loads.

Thus it is seen that PolyPhase regulators and regulation techniques according to the invention, operating at high efficiencies under light load conditions, have been provided. Persons skilled in the art will appreciate that the present invention can be practiced by other than the described embodiments, which are presented for purposes of illustration rather than of limitation, and the present invention is limited only by the claims which follow.

What is claimed is:

1. A multi-channel multi-phase voltage regulator, the regulator comprising:

a high frequency power inductor in a power loop of each channel of the regulator, the inductor that provides a portion of an output current of the regulator, and wherein the inductor exhibits non-linear inductance over the operational range of the regulator; and at least one detection circuit that compares the output current of the regulator to a first threshold current and that shuts down a select one channel of the multi-channel multi-phase regulator when the detection circuit determines that, based on the comparison, the output current is less than the first threshold current.

2. The regulator of claim 1, wherein the detection circuit further compares the output current to a second threshold current to form a second comparison, and shuts down at least a second channel of the regulator when the detection circuit determines that, based on the comparison to the second threshold current, the output current is below the second threshold current.

3. The regulator of claim 1, wherein the detection circuit places at least one remaining regulator channel in stand-by mode in the light load condition.

4. The regulator of claim 1, wherein the detection circuit places at least one remaining regulator channel in stand-by mode when the detection circuit determines that, based on a comparison to a second threshold current, the output current is less than the second threshold current, and wherein the second threshold current is different from the first threshold current.

5. The regulator of claim 1, wherein the detection circuit comprises a current comparator circuit.

6. The regulator of claim 1, wherein the regulator renumbers phases of the regulator after the channel has been shut down.

7. A method for regulating a voltage using a multi-phase multi-channel regulator, the method comprising:

periodically charging and discharging an inductor in a power loop of each channel of the voltage regulator to provide a portion of an output current of the regulator;

comparing the output current to a first threshold current; and when the comparison determines that the output current is less than the first threshold current, shutting down a select first channel of the regulator.

8. The method of claim 7 further comprising:

comparing the output current to a second threshold current to form a second comparison, and when the second comparison reveals that the output current is less than the second threshold current, shutting down a second channel of the regulator.

9. The method of claim 7 further comprising placing at least one remaining channel in stand-by mode when the comparison reveals that the output current is less than the first threshold current.

10. The method of claim 7 further comprising:

comparing the output current to a second threshold current to form a second comparison; and when the second comparison reveals that the output current is less than the second threshold current, placing at least one remaining channel in stand-by mode.

11. The method of claim 7 the comparing further comprising comparing using a current comparator circuit.

12. The method of claim 7 further comprising renumbering phases of the regulator after the shutting down of the select one channel.

* * * * *